June 17, 1958
A. ROSCH
2,839,071
SAFETY DEVICE FOR ROTARY MACHINES OR ENGINES WITH THRUST BEARINGS
Filed May 20, 1955
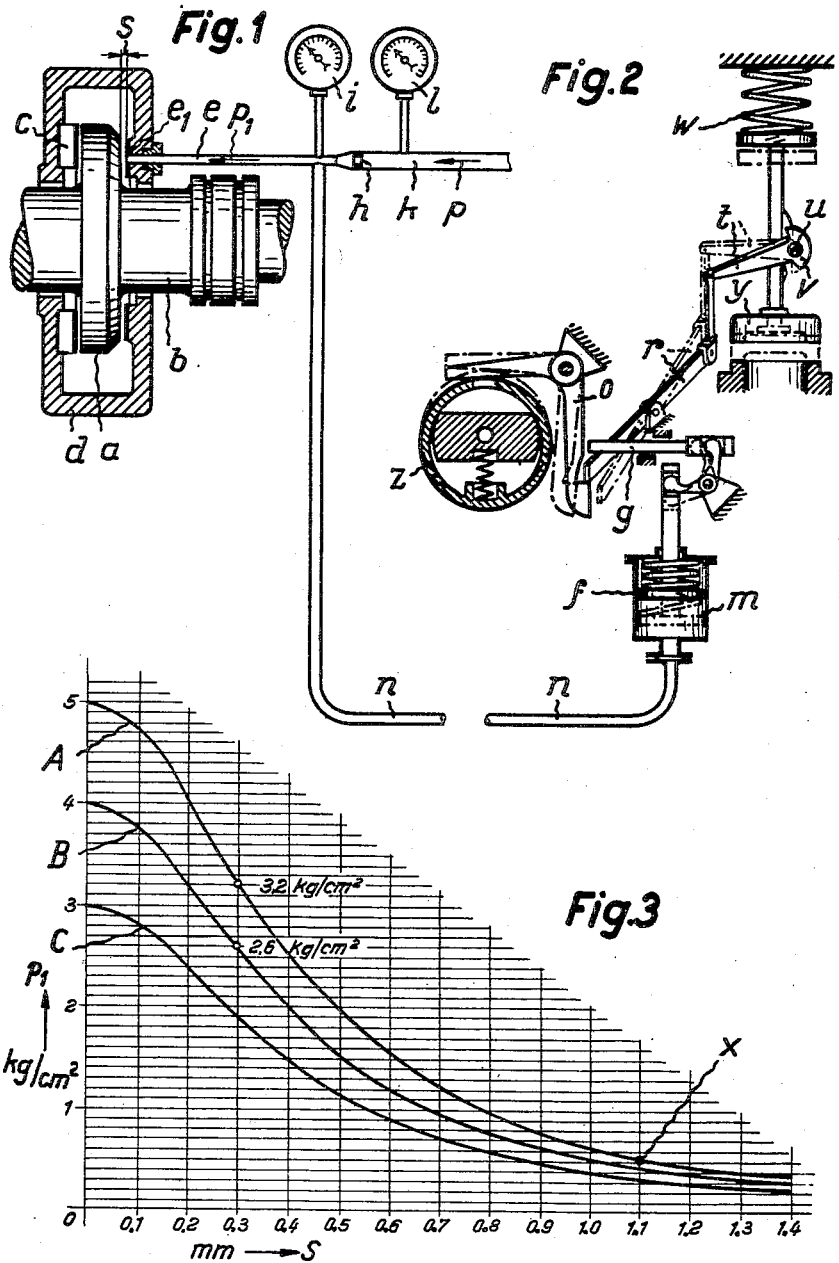
Inventor:
*Arthur Rosch*
By
PATENT AGENT

United States Patent Office 2,839,071
Patented June 17, 1958

2,839,071

SAFETY DEVICE FOR ROTARY MACHINES OR ENGINES WITH THRUST BEARINGS

Arthur Rosch, Berlin-Grunewald, Germany, assignor to Licentia Patent-Verwaltungs-G. m. b. H., Hamburg, Germany Application May 20, 1955, Serial No. 509,962
In Germany October 1, 1948

Public Law 619, August 23, 1954
Patent expires October 1, 1968

6 Claims. (Cl. 137—37)

The present invention relates to safety devices for rotary machines or engines with thrust bearings, for example, prime movers, such as steam or gas turbines, or compressors. Safety devices of this kind have been known which cause the operating fluid to be cut off, when the thrust blocks of the thrust bearing are worn away beyond a certain permissible degree. In the event of such emergency, one of the known devices of this type acts on a pair of electric contacts to engage one another whereby an electric circuit is closed in which an electromagnet coil is inserted. Thus this magnet is energized and actuates an emergency shut-off device stopping the machine. However, the safety of the plant will be jeopardised, when the electric contacts become dirty, or if one of the conductors of the electric safety circuit should break, or if the electric current supply fails. According to another construction suggested heretofore, displacements of the main shaft of the rotary prime mover are transmitted to the operating rod of an emergency shut-off device by means of levers via slide rollers or slide blocks. Due to wear of these slide rollers or slide blocks the action of the safety device may be delayed, which is very dangerous. Moreover, such safety devices can be applied only to machines in which the thrust bearing is disposed close to the emergency shut-off device. Another well known safety device of this kind comprises a rotating valve at the end of the engine shaft, this valve controlling a pressure medium acting on the emergency shut-off device under control of axial displacements of the shaft. Also in this case, the required precision of the action is impaired by wear and tear occurring in the revolving valve.

It is an object of the present invention to overcome these disadvantages and limitations of the known safety devices.

It is another object of the invention to provide a safety device for rotary machines and engines with thrust bearings, particularly for steam or gas turbines, said device being adapted to stop the machine when the wear in the thrust bearing has reached a predetermined amount by causing oil under pressure to flow through a pipe into the thrust bearing casing, whereby an orifice through which this oil is discharged is disposed opposite to a side face of the thrust bearing disc and so close to this disc that a throttle effect is produced which varies with the variation of the distance between the thrust disc and said discharge orifice and thus causes a corresponding pressure variation in the oil pressure pipe, said variation controlling an impulse in the safety device causing the machine or engine to stop.

Further important objects and advantageous features of the invention will become apparent from the accompanying drawing froming part of this disclosure, wherein Fig. 1 shows diagrammatically a safety device according to the invention, parts of the device being illustrated in section. Fig. 2 illustrates a construction detail also partially in section, and Fig. 3 is a diagram to facilitate the understanding of the operation of the new safety device.

As shown in Fig. 1, a thrust disc $a$ of a thrust bearing is mounted on a shaft $b$ of a prime mover, not shown. This thrust disc $a$ and thrust blocks $c$ frictionally engaging the latter are arranged within a casing $d$ of the thrust bearing. A pipe $e$ is connected to a source of oil under pressure, such as an oil pump for supplying oil to the bearings and control elements. This pipe ends in the casing $d$. The orifice $e_1$ of the pipe $e$ inside the casing $d$ is disposed opposite to and a short distance from one of the side faces of the thrust disc $a$. The width of the gap $s$, i. e. the distance between the orifice $e_1$ of the pipe and said side face, will be increased with increased wear of the thrust blocks $c$. Thus, the oil discharged from the pipe $e$ inside the casing $d$ is subject to throttle actions varying with changes in the distance between the thrust disc $a$ and the discharge orifice $e_1$ of the pipe $e$. The varying throttle actions cause pressure variations in this pipe $e$ corresponding to the changes in the distance between the disc $a$ and the orifice $e_1$, of the pipe $e$.

The impulse of the actuation of the device controlling the supply of the driving medium to the prime mover is derived from the oil pressure $p_1$ within the pipe $e$, said pressure being dependent upon the width of the gap $s$ between the thrust disc $a$ and the opposite face of the casing $d$, as set forth above. A throttle member $h$ positioned in the control oil pipe serves as preliminary throttle. The supply pipe to this preliminary throttle is fed by a pump maintaining a constant pressure.

In the shown embodiment, pressure $p_1$ actuates through the pipe $n$ the pressure control $m$ shown in Fig. 2 and the spring loaded piston $f$ of which is maintained in its highest position in normal operation. The emergency lever $o$ is in engaged position with the lever $r$. If the pressure $p_1$ is reduced on account of increase of the gap $s$ to such an extent that the piston $f$ is moved downward by its spring, the emergency device $g$ is moved by a bellcrank lever in the direction of the turbine axis and the emergency lever $o$ thereby is pivoted clockwise causing the engagement of the lever $r$ to be released. Thereat, this lever $r$ pivots counterclockwise, moves the lever $t$ upward and turns the ratchet shaft $u$ clockwise causing the ratchet $v$ to be disengaged. This results in the emergency valve $y$ being closed by the spring $w$. This emergency valve $y$ is also influenced by the effect of a known emergency regulator $z$.

The point $x$ shown in Fig. 3 and which is to designate the actuation of the emergency device in response to the pressure caused in the pipe $n$ may be adjusted by setting the spring of the piston $f$.

The dot-and-dash lines designate the position of the emergency device in disengaged position.

In order to enable the operator to check at any time independently of the actuation the safety device the state of the axial displacement of the thrust disc in the thrust bearing, a pressure gauge $i$ is connected to the pipe $e$ at a place between the orifice plate $h$ and the gap $s$. The oil pressure $p_1$ in the pipe $e$ behind the orifice plate $h$, varying inversely with respect to the width of the gap $s$, represents the correct value for the distance $s$ at the instant of test only, if the pressure $p$ in supply pipe $k$ in front of the orifice plate $h$ remains constant. Therefore another pressure gauge $l$ is connected to the pipe $k$ to indicate the pressure $p$ within this pipe $k$. If this pressure varies, the relationship between pressure $p_1$ and the width of the gap $s$ will change, as it is shown in the diagram Fig. 3.

In the co-ordinate system shown in the diagram Fig. 3, the width of the gap $s$ is plotted as abscissae in tenths of millimetres, while the values of the oil pressure $p_1$ behind the orifice plate $h$ in kg./cm. are plotted as ordinates. The curves A, B and C in the diagram indicate the relationship between the width of the gap $s$ and the oil pressure $p_1$ as a function of the pressures $p$ of 5, 4 and 3 kg./cm.$^2$, respectively. For example, according to the diagram of Fig. 3, the oil pressure $p_1$ behind the orifice plate $h$ will be 3.2 kg./cm.$^2$, if the oil pressure $p$ in the supply pipe $k$ in front of the orifice plate $h$ is 5 kg./cm.$^2$ and the width of the gap $s$ is 0.3 mm., which conditions may be considered as normal. If the oil pressure $p$ in the supply pipe $k$ drops for any reason to 4 kg./cm.$^2$ and the width of the gap $s$ remains 0.3 mm., the pressure $p_1$ within the pipe $e$ behind the orifice plate $h$ will decrease to 2.6 kg./cm.$^2$.

With the aid of these different curves it is possible to precisely ascertain at any time, even with varying pressures of the supply of the oil to the control device, the wear of the thrust disc $a$ or of the thrust blocks $c$ in the thrust bearing.

The reliability of the safety device is not affected by variations in the pressure $p$ in the supply pipe $k$. It is assumed that the normal pressure $p$ of the oil fed to the control device is 5 kg./cm.$^2$, and that the safety device is adjusted to become operative at a pressure $x$, i. e., when the wear of the thrust blocks has increased the gap $s$ from 0.3 mm. to 1 mm. If it should now happen that the pressure $p$ of the oil supplied to the control device decreases to 4 kg./cm.$^2$, the safety device would already be actuated, when the wear of the thrust blocks $c$ amounts to 0.6 mm. and the gap $s$ has a width of 0.9 mm. Thus, the only consequence of a decreased pressure $p$ in the oil supplied to the control device is that the safety device will be operated at a little earlier stage of the wear of the thrust blocks.

The advantage obtained by the invention is that the safety device will function under any circumstances, and that it is possible to continuously check at will the instantaneous state of wear within the thrust bearing. The machine or engine is stopped by the safety device according to the invention by completely interrupting the oil supply for its operation. The safety device is not limited in its application by conditions of space and design and can be applied to thrust bearings in compressors or other machines which may be arranged at a considerable distance from the emergency shut-off device.

While in the appended drawing only one preferred embodiment of the invention has been shown, it will be understood that the construction thereof and the arrangement of the parts may be altered without departing from the spirit and scope of the invention to be determined by the following claims.

I claim:

1. A pressure modulating device for a control fluid used in the control of a machine or prime mover, said control fluid being independent of the lubricant employed in the bearings of said machine or prime mover, a pressure-responsive organ, conduit means between a housing of at least one of said bearings and said pressure-responsive organ, a shaft journalled in said bearing, a thrust disk on said shaft within said bearing housing, said conduit means ending in said housing opposite said disk with a narrow gap left between the end of said conduit means and said disk, means operatively connected with said pressure-responsive organ and being adapted to cause said machine or prime mover to be relieved from its load when said pressure-responsive organ is actuated by a change in pressure of said control fluid due to change in the width of said gap as a result of excessive wear in said bearing.

2. A pressure modulating device according to claim 1, wherein a shut-off means for the power supply to said machine or prime mover is operatively connected with said pressure-responsive organ, so that, upon actuation of said organ and thereby said shut-off means, the power supply to said machine or prime mover is shut-off.

3. A pressure modulating device according to claim 1, wherein a pressure gauge is connected to said conduit means which indicates the condition of wear in said bearing.

4. A pressure modulating device according to claim 1, wherein a pressure-equalizing means is provided at the inlet of said conduit means.

5. A pressure modulating device according to claim 4, wherein said pressure-equalizing means comprises a plate with a small central orifice.

6. A pressure modulating device according to claim 4, wherein a first pressure gauge is connected to said conduit means in front of said pressure-equalizing means and a second pressure gauge behind said pressure-equalizing means.

References Cited in the file of this patent

UNITED STATES PATENTS

| | | |
|---|---|---|
| 1,509,695 | Volet | Sept. 23, 1924 |
| 2,112,664 | Dube | Mar. 29, 1938 |
| 2,435,343 | Downey | Feb. 3, 1948 |
| 2,502,318 | Fischer | Mar. 28, 1950 |